United States Patent
Liang et al.

(10) Patent No.: US 10,875,984 B2
(45) Date of Patent: Dec. 29, 2020

(54) INORGANIC SHELL, RESIN COMPOSITION, AND METHOD FOR MAKING INORGANIC SHELL

(71) Applicant: Zhen Ding Technology Co., Ltd., Taoyuan (TW)

(72) Inventors: Kuo-Sheng Liang, Taoyuan (TW); Shou-Jui Hsiang, Taoyuan (TW); Mao-Feng Hsu, Taoyuan (TW); Hong-Ping Lin, Taoyuan (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 151 days.

(21) Appl. No.: 15/826,615

(22) Filed: Nov. 29, 2017

(65) Prior Publication Data

US 2019/0055378 A1 Feb. 21, 2019

(30) Foreign Application Priority Data

Aug. 18, 2017 (CN) .......................... 2017 1 0712699

(51) Int. Cl.
| | |
|---|---|
| *C08K 7/26* | (2006.01) |
| *C08K 9/06* | (2006.01) |
| *C04B 35/14* | (2006.01) |
| *B28B 7/34* | (2006.01) |
| *B28B 1/30* | (2006.01) |
| *C04B 35/447* | (2006.01) |
| *C04B 35/622* | (2006.01) |
| *C04B 38/00* | (2006.01) |
| *C01B 33/18* | (2006.01) |
| *C04B 111/00* | (2006.01) |

(52) U.S. Cl.
CPC .................. *C08K 7/26* (2013.01); *B28B 1/30* (2013.01); *B28B 7/342* (2013.01); *B28B 7/348* (2013.01); *C01B 33/18* (2013.01); *C04B 35/14* (2013.01); *C04B 35/447* (2013.01); *C04B 35/62222* (2013.01); *C04B 38/009* (2013.01); *C08K 9/06* (2013.01); *C04B 2111/00844* (2013.01); *C04B 2235/3232* (2013.01); *C04B 2235/3418* (2013.01); *C04B 2235/447* (2013.01); *C04B 2235/95* (2013.01)

(58) Field of Classification Search
CPC ....................................................... C08K 7/26
See application file for complete search history.

(56) References Cited

U.S. PATENT DOCUMENTS

| | | | | |
|---|---|---|---|---|
| 2005/0016726 A1* | 1/2005 | Nguyen | ................. | B82Y 30/00 166/278 |
| 2013/0338254 A1* | 12/2013 | Nguyen | ................. | C08G 77/04 523/131 |

FOREIGN PATENT DOCUMENTS

| | | |
|---|---|---|
| CN | 101274246 A | 10/2008 |
| CN | 101585948 A | 11/2009 |
| CN | 102531556 A | 7/2012 |
| CN | 102781663 A | 11/2012 |
| CN | 103691415 A | 4/2014 |
| TW | 201339215 A | 10/2013 |

* cited by examiner

*Primary Examiner* — Edward J Cain
(74) *Attorney, Agent, or Firm* — ScienBiziP, P.C.

(57) ABSTRACT

An inorganic shell is ball-shaped and hollow, and includes silica and crystalline inorganic powder sintered together. A resin composition has the inorganic shells and the resin composition has certain dieletric characteristics. A method for making the inorganic shell is also provided.

18 Claims, 7 Drawing Sheets

INORGANIC SHELL, RESIN COMPOSITION, AND METHOD FOR MAKING INORGANIC SHELL

CROSS-REFERENCE TO RELATED APPLICATIONS

This application claims priority to Chinese Patent Application No. 201710712699.8 filed on Aug. 18, 2017, the contents of which are incorporated by reference herein.

FIELD

The subject matter herein generally relates to inorganic shell, resin composition, and method for making inorganic shell.

BACKGROUND

Signal transmission in electronic product is digital in high frequency, thus a resin material in electronic product should have proper dielectric properties, such as a lower dielectric constant ($D_k$) and a lower loss factor ($D_f$). The lower $D_k$ may be less than 3.0, and the lower $D_f$ may be less than 0.01. A resin material with an inorganic filler, such as silica formed by high temperature sintering, has a lower $D_f$ of about 0.0001, but the $D_k$ is almost up to 3.8.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

Figure 1:
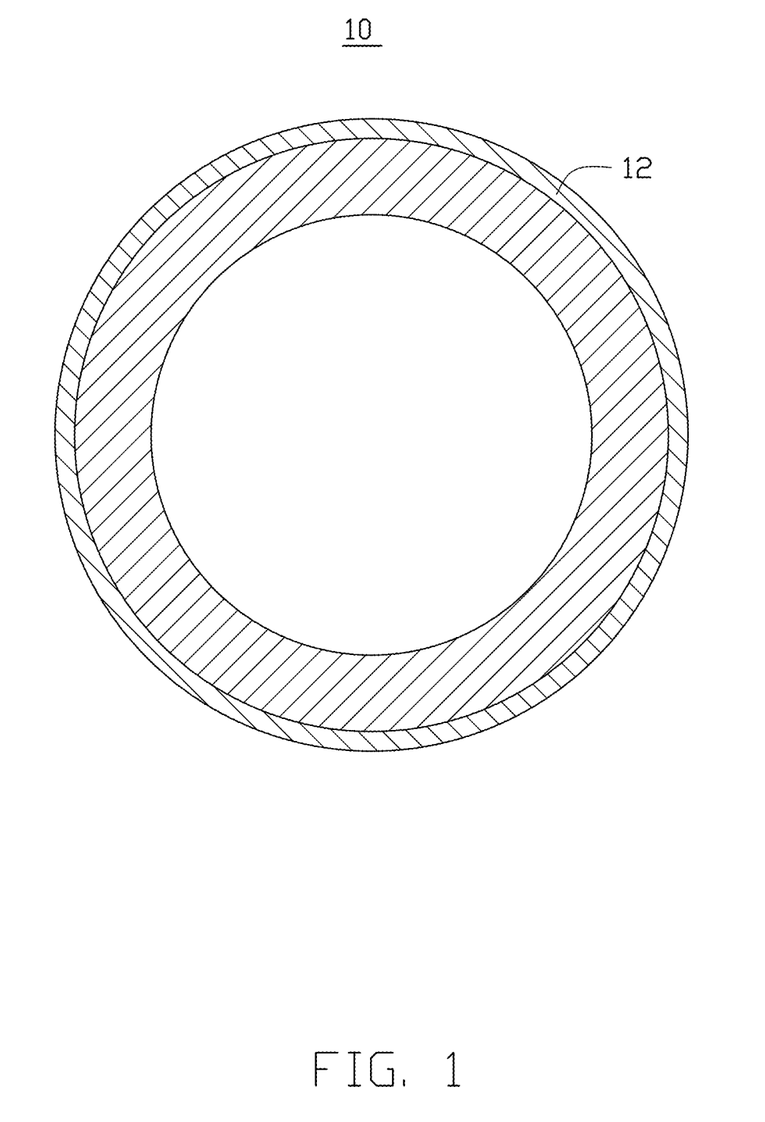
FIG. 1 is a cross-sectional view of an inorganic shell according to a first exemplary embodiment.

FIG. 1 illustrates a first exemplary embodiment of an inorganic shell 10. The inorganic shell 10 can be used as filler in a base layer, an adhesive layer, or a cover layer of a printed circuit board. The inorganic shell 10 is hollow. The inorganic shell 10 includes inorganic powder. The inorganic powder includes silica and crystalline inorganics.

A mass percentage of the silica in the inorganic powder is preferred more than 50%.

In the exemplary embodiment, the inorganic shell 10 is a hollow ball.

In the exemplary embodiment, the crystalline inorganic powder can be crystalline metal oxide or crystalline inorganic salts.

In the exemplary embodiment, the crystalline inorganic powder can be aluminum phosphate or titanium dioxide.

In the exemplary embodiment, the silica and the crystalline inorganic powder are sintered together at an oven temperature in a range from 750 degrees Celsius to 1200 degrees Celsius.

In the exemplary embodiment, a shell thickness of the inorganic shell 10 can be 20 nanometers or more.

Preferably, the shell thickness of the inorganic shell 10 is in a range from 20 nanometers to 30 nanometers.

Preferably, an outer diameter of the inorganic shell 10 is in a range from 0.2 micrometers to 0.5 micrometers.

In the exemplary embodiment, the inorganic shell 10 includes a surface modification layer 12 on surfaces thereof. The surface modification layer 12 is formed by grafting modifier as organic functional groups on the surfaces thereof. The surface modification layer 12 makes the inorganic shell 10 easy to disperse into a resin composition.

In the exemplary embodiment, the modifier is silane compounds.

Preferably, the modifier is vinyltrimethoxy silane, and molecular formula of the modifier is:

A second exemplary embodiment provides a resin composition. The resin composition can be used to make a base layer, an adhesive layer, or a cover layer of a printed circuit board. The resin composition includes resin material and inorganic shells as illustrated in the first exemplary embodiment. The inorganic shells are dispersed in the resin material.

Figure 2:
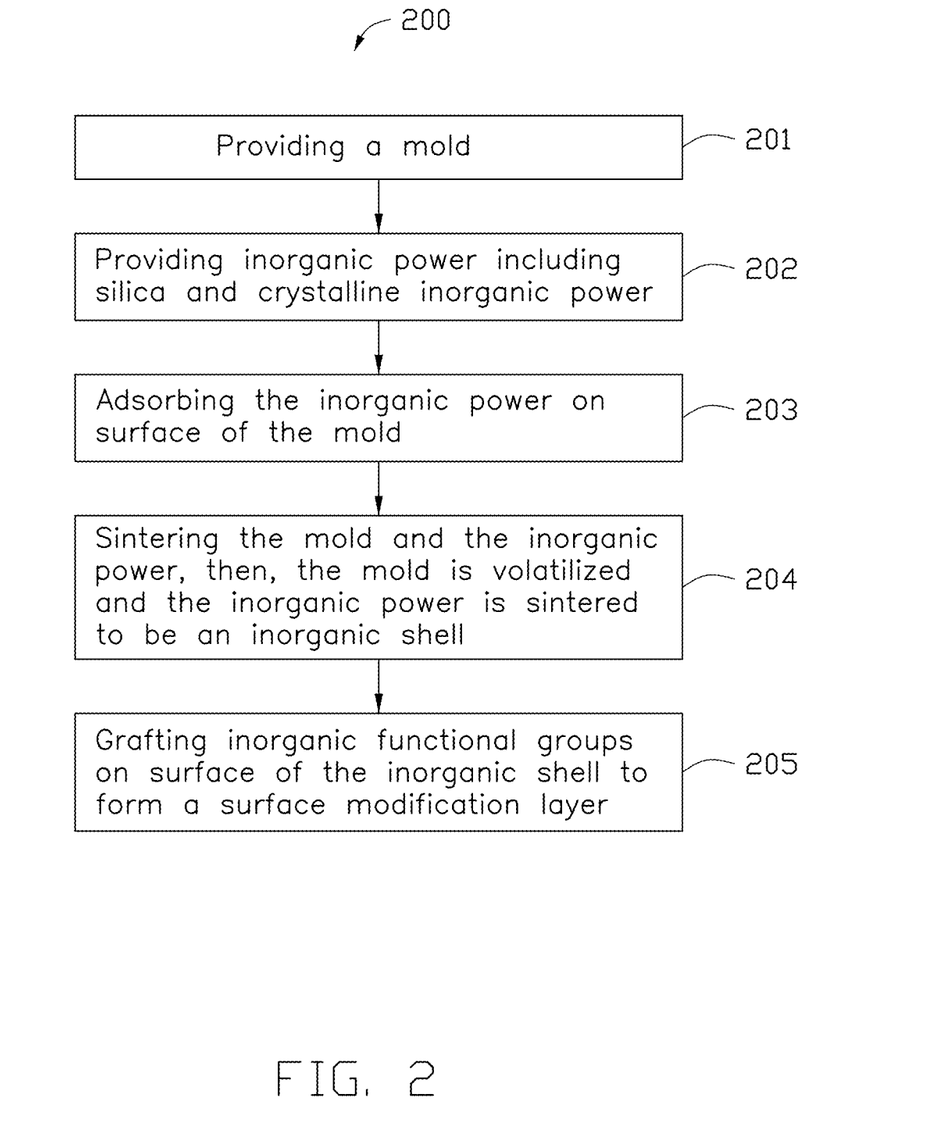
FIG. 2 is a flow chart of an exemplary embodiment of a method for preparing an inorganic shell.

Referring to the FIG. 2, a flowchart shows an example embodiment for a method for preparing an inorganic shell. An example method 200 is provided by way of example, as there are a variety of ways to carry out the method. The method 200 described below can be carried out using the configurations illustrated in the figure, for example, and various elements of these figures are referenced in explaining example method 200. Each block shown in the figure represents one or more processes, methods, or subroutines, carried out in the exemplary method 200. Additionally, the illustrated order of blocks is by example only and the order of the blocks can change. The exemplary method 200 can begin at block 201.

At block 201, providing a mold.

At block 202, providing inorganic powder including silica and crystalline inorganic powder.

At block 203, adsorbing the inorganic powder on surface of the mold.

At block 204, sintering the mold and the inorganic powder, the mold being volatilized and the inorganic powder is sintered into being an inorganic shell.

At block 205, grafting organic functional groups on surface of the inorganic shell to form a surface modification layer.

Figure 3:
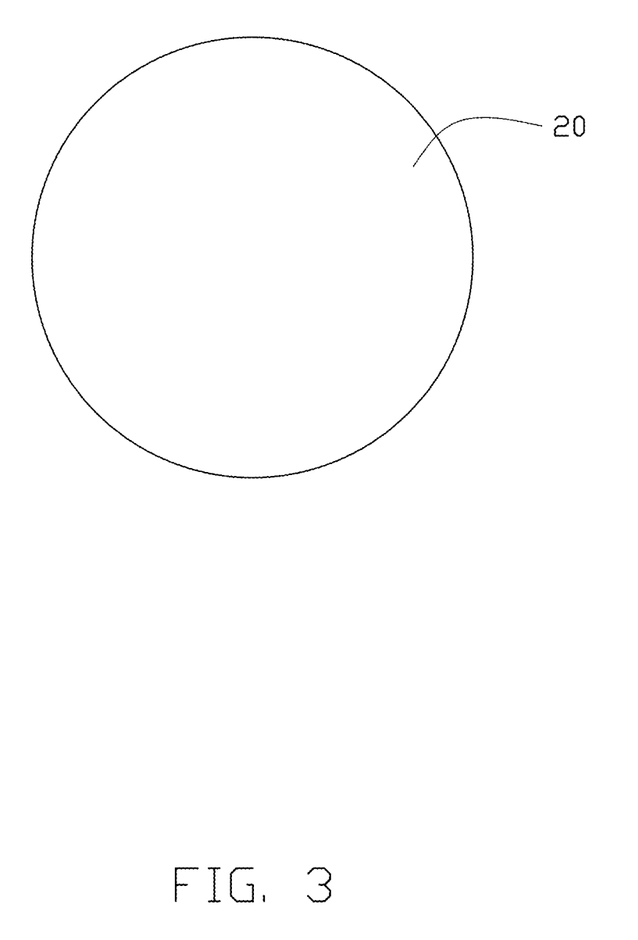
FIG. 3 is a cross-sectional view of a mold according to a second exemplary embodiment.

At block 201, as shown in FIG. 3, the mold 20 is made of material such as plastic that can be volatilized at a certain temperature.

In the exemplary embodiment, the mold 20 is made of polymethylmethacrylate (PMMA), and the mold 20 can be volatilized at an oven temperature higher than 270 degrees Celsius.

In the exemplary embodiment, the mold 20 is ball-shaped.

At block 202, a mass percentage of the silica in the inorganic powder is preferred to be more than 50%.

In the exemplary embodiment, the crystalline inorganic powder can be crystalline metal oxide or crystalline inorganic salts.

In the exemplary embodiment, the crystalline inorganic powder can be aluminum phosphate or titanium dioxide.

Figure 4:
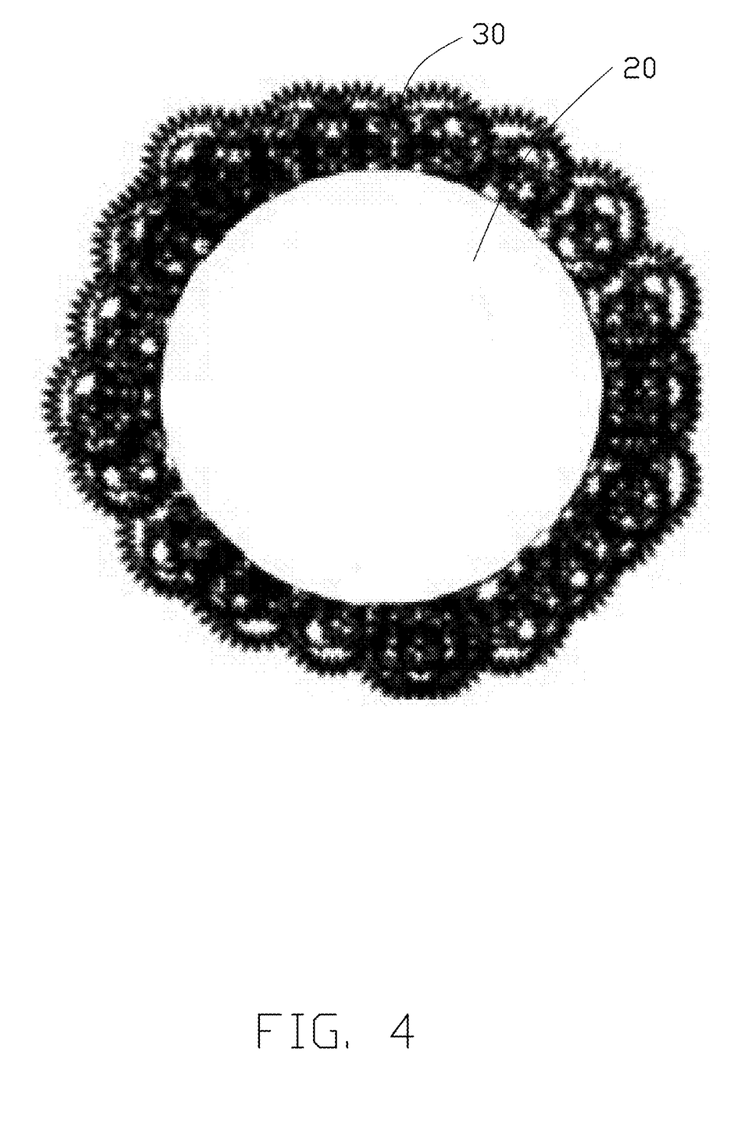
FIG. 4 is a cross-sectional view of inorganic shell adsorbed on surface of the mold in FIG. 2.

At block 203, as shown in FIG. 4, the inorganic powder is adsorbed on the surface of the mold, and is ball ring-shaped.

In the exemplary embodiment, surfactants and PH value adjusting solution can be added into the inorganic powder to make the inorganic powder evenly adsorbed.

A thickness of the inorganic shell is depending on a thickness of the inorganic powder adsorbed on the surface of the mold, and the thickness of the inorganic powder adsorbed on the surface of the mold is a function of adsorption parameters, such as length of adsorption time.

At block 204, in the exemplary embodiment, a sintering temperature of the oven can be in a range from 750 degrees Celsius to 1200 degrees Celsius. The mold is decomposed into molecules and then is volatilized.

In the exemplary embodiment, a shell thickness of the inorganic shell 10 can be 20 nanometers or more than 20 nanometers.

Preferably, the shell thickness of the inorganic shell 10 is in a range from 20 nanometers to 30 nanometers.

Preferably, an outer diameter of the inorganic shell 10 is in a range from 0.2 micrometers to 0.5 micrometers.

At block 205, as shown in FIG. 1, in the exemplary embodiment, a surface modification layer 12 is formed by grafting modifier as organic functional groups on the surfaces of the inorganic shell 10.

In the exemplary embodiment, the modifier is silane compounds.

Preferably, the modifier is vinyltrimethoxy silane, molecular formula of the modifier is:

A principle of grafting modifier as organic functional groups on the surfaces of the inorganic shell is: three O—CH₃ functional groups of vinyltrimethoxysilane separately have a polycondensation reaction with three Si—O bonds on the surface of the inorganic shell, to form Si—O—Si bonds on the surface of the inorganic shell. Vinyl functional groups are thus grafted on the surface of the inorganic shell; a chemical reaction formula of the polycondensation reaction is:

COMPARATIVE EXAMPLE 1

A ball-shaped mold is provided. Inorganic powder including silica and aluminum phosphate is adsorbed on surface of the mold, and is sintered with the mold at an oven temperature of 600 degrees Celsius, to obtain an inorganic shell.

Example 1

A ball-shaped mold is provided. Inorganic powder including silica and aluminum phosphate is adsorbed on surface of the mold, and is sintered with the mold at an oven temperature of 950 degrees Celsius, to obtain an inorganic shell.

Figure 5:
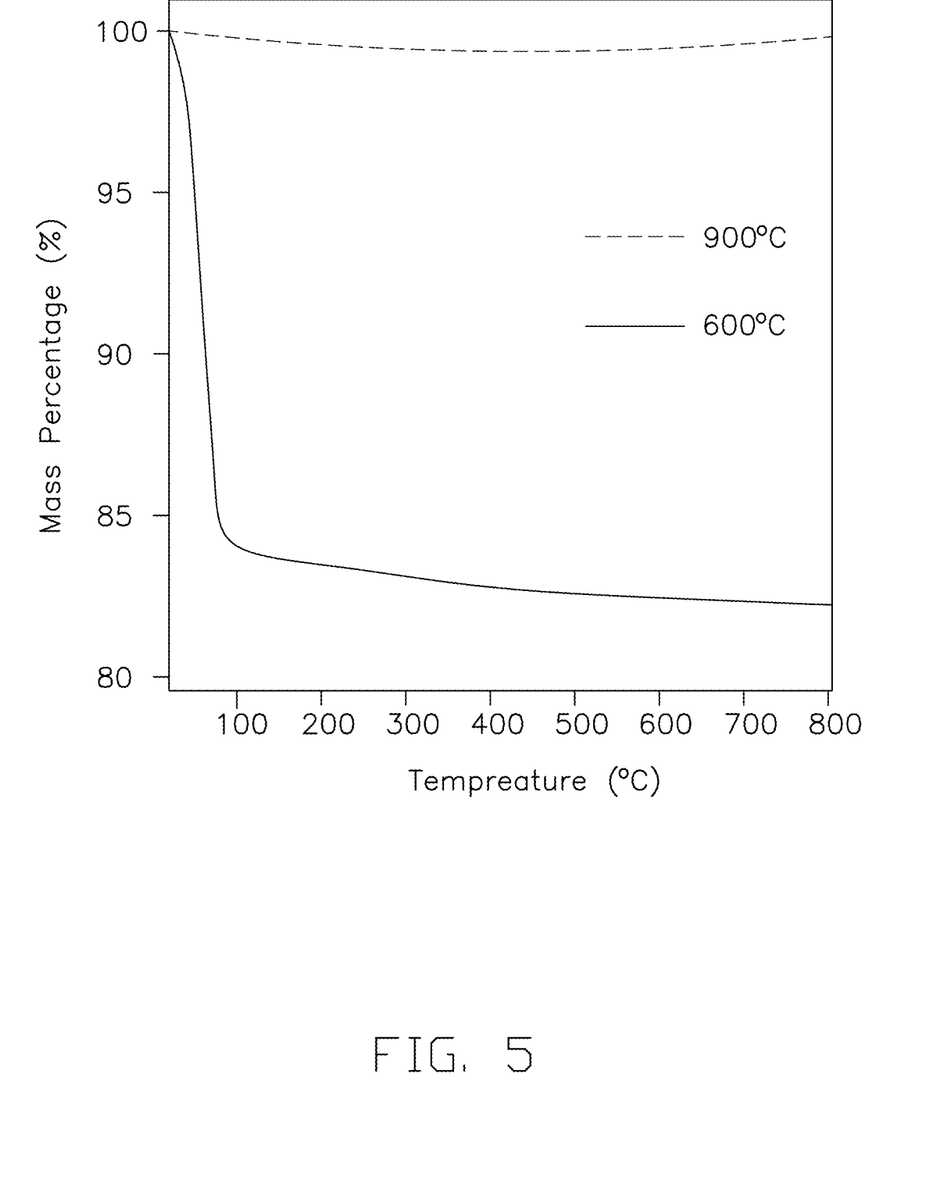
FIG. 5 shows results of thermogravimetric (TGA) analysis of products in comparative example 1 and example 2.

As shown in FIG. 5, in TGA test, a weight loss of the inorganic shell of comparative example 1 is more than 15%, but a weight loss of the inorganic shell of example 1 is close to zero. That is, when an oven temperature in sintering the mold and the inorganic powder is low, such as equal to or less than 600 degrees Celsius, the inorganic shell easily absorbs moisture.

COMPARATIVE EXAMPLE 2

A ball-shaped mold is provided. Inorganic powder including silica and aluminum phosphate is adsorbed on surface of the mold, and is sintered with the mold at an oven temperature of 950 degrees Celsius, to obtain an inorganic shell. A shell thickness of the inorganic shell is 10 nanometers.

Example 2

A ball-shaped mold is provided. Inorganic powder including silica and aluminum phosphate is adsorbed on surface of the mold, and is sintered with the mold at an oven temperature of 950 degrees Celsius, to obtain an inorganic shell. A shell thickness of the inorganic shell is 20 nanometers.

Figure 6:
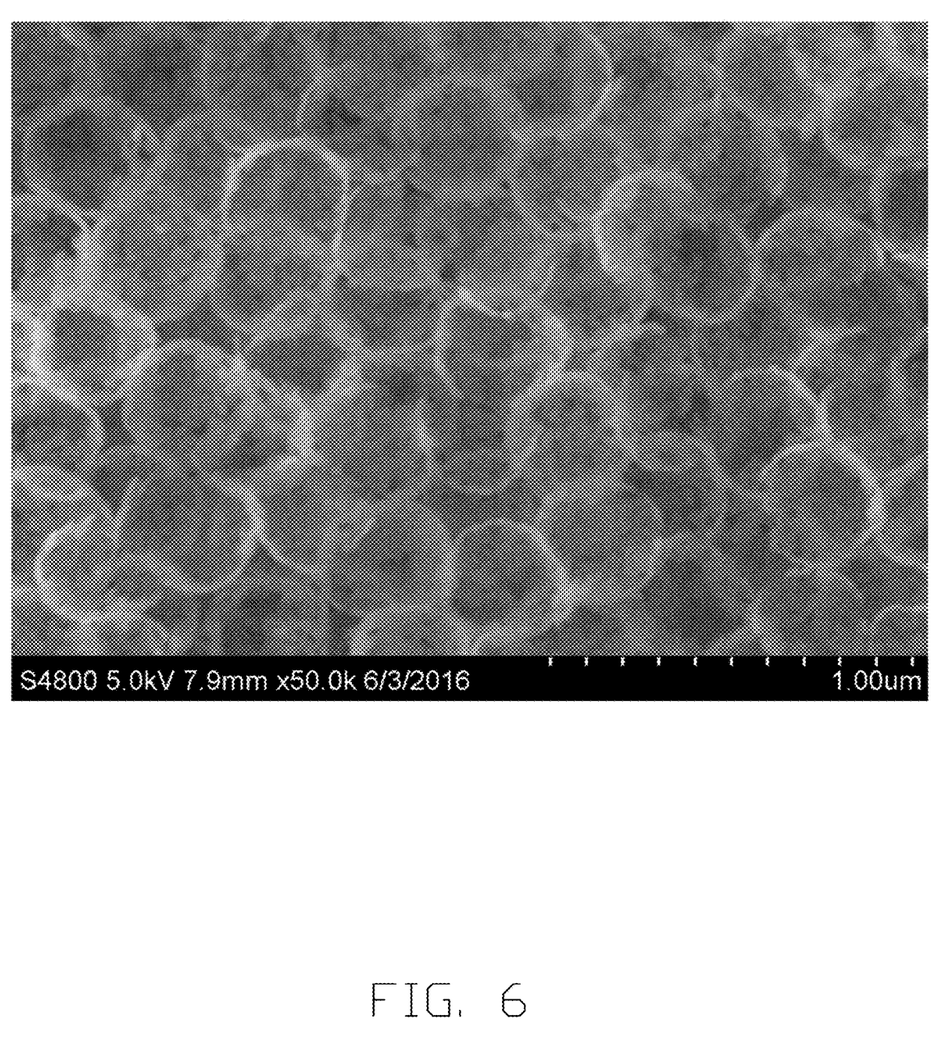
FIG. 6 is scanning electron microscopy view of products in comparative example 2.
Figure 7:
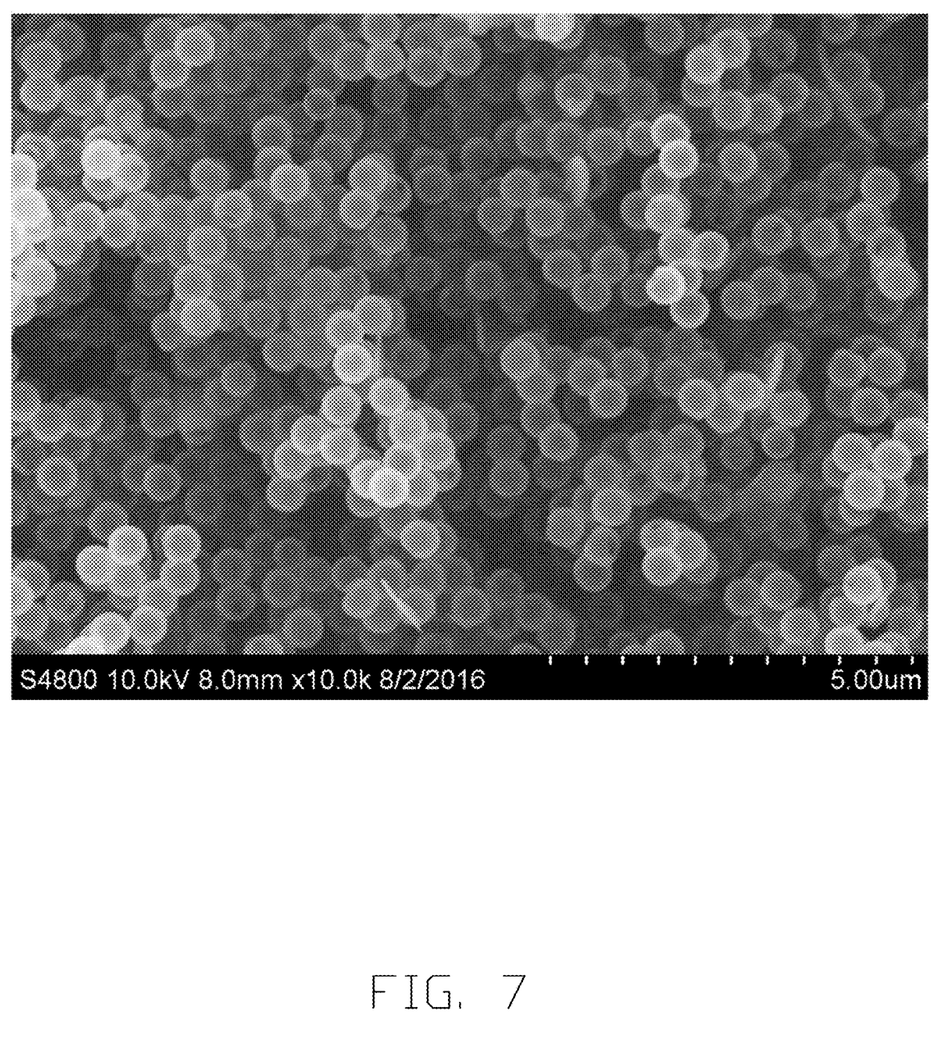
FIG. 7 is scanning electron microscopy view of products in example 2.

As shown in FIGS. 6-7, in scanning electron microscopy test, a shell of the inorganic shell of comparative example 2 is like a broken ball and is non-hollow, but a shell of the inorganic shell of example 2 is a complete ball and is hollow. That is, when a thickness of the inorganic shell is increased, to be equal to or more than 20 nanometers, the inorganic shell may be a complete ball and is hollow.

COMPARATIVE EXAMPLE 3

Silica is sintered at an oven temperature of 1750 degrees Celsius, to obtain silica grains. Diameters of each of the silica grains are 5 nanometers to 20 nanometers.

COMPARATIVE EXAMPLE 4

A ball-shaped mold is provided. Powder including silica is adsorbed on surface of the mold, and is sintered with the mold at an oven temperature of 600 degrees Celsius, to obtain a shell. A shell thickness of the shell is 20 nanometers. An outer diameter of the shell is in a range from 0.2 micrometers to 0.5 micrometers.

COMPARATIVE EXAMPLE 5

A ball-shaped mold is provided. Powder including silica is adsorbed on surface of the mold, and is sintered with the mold at an oven temperature of 950 degrees Celsius, to obtain a shell. A shell thickness of the shell is 20 nanometers. An outer diameter of the shell is in a range from 0.2 micrometers to 0.5 micrometers.

COMPARATIVE EXAMPLE 6

A ball-shaped mold is provided. Inorganic powder including silica and aluminum phosphate is adsorbed on surface of the mold, and is sintered with the mold at an oven temperature of 950 degrees Celsius, to obtain an inorganic shell. A shell thickness of the inorganic shell is 10 nanometers. An outer diameter of the inorganic shell is in a range from 0.2 micrometers to 0.5 micrometers.

Example 3

A ball-shaped mold is provided. Inorganic powder including silica and aluminum phosphate is adsorbed on surface of the mold, and is sintered with the mold at an oven temperature of 950 degrees Celsius, to obtain an inorganic shell. A shell thickness of the inorganic shell is 20 nanometers. An outer diameter of the inorganic shell is in a range from 0.2 micrometers to 0.5 micrometers.

Example 4

A ball-shaped mold is provided. Inorganic powder including silica and aluminum phosphate is adsorbed on surface of the mold, and is sintered with the mold at an oven temperature of 950 degrees Celsius, to obtain an inorganic shell. A shell thickness of the inorganic shell is 30 nanometers. An outer diameter of the inorganic shell is in a range from 0.2 micrometers to 0.5 micrometers.

Performance data of samples in comparative examples 3-6 and examples 3-4 is shown in the following table 1:

That is: inorganic shells in examples 3-4 have a lower $D_f$ and a lower $D_k$.

The exemplary embodiments shown and described above are only examples. Many details are often found in the art, and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. An inorganic shell, being hollow, and being sintered with inorganic powder, the inorganic powder comprising silica and crystalline inorganics; a shell thickness of the inorganic shell is in a range from 20 nanometers to 30 nanometers.

2. The inorganic shell of claim 1, wherein a mass percentage of the silica in the inorganic powder is more than 50%.

3. The inorganic shell of claim 1, wherein the crystalline inorganic powder is crystalline metal oxide or crystalline inorganic salts.

4. The inorganic shell of claim 3, wherein the crystalline inorganic powder is aluminum phosphate or titanium dioxide.

5. The inorganic shell of claim 1, wherein the inorganic shell comprises a surface modification layer on surfaces thereof, the surface modification layer is formed by grafting modifier as organic functional groups on the surfaces thereof.

6. The inorganic shell of claim 5, wherein the modifier is silane compounds.

7. The inorganic shell of claim 6, wherein the modifier is vinyltrimethoxy silane, and molecular formula of the modifier is:

8. A resin composition, comprising:
resin material; and
inorganic shells, the inorganic shells being dispersed in the resin material, each inorganic shell being hollow and comprising silica and crystalline inorganic powder sintered together with the silica by a high temperature

TABLE 1

| | comparative example 3 | comparative example 4 | comparative example 5 | comparative example 6 | Example 3 | Example 4 |
|---|---|---|---|---|---|---|
| if shell of sample is broken | N/A | yes | yes | yes | no | no |
| $D_k$ | 3.8 | 3.7 | 3.6 | 3.3 | 2.8 | 2.8 |
| $D_f$ | 0.0001 | 0.0012 | 0.0001 | 0.0001 | 0.0001 | 0.0001 | sintering process; a shell thickness of the inorganic shell is in a range from 20 nanometers to 30 nanometers.

9. The resin composition of claim 8, wherein the crystalline inorganic powder is crystalline metal oxide or crystalline inorganic salts.

10. The resin composition of claim 9, wherein the crystalline inorganic powder is aluminum phosphate or titanium dioxide.

11. The resin composition of claim 8, wherein the inorganic shell comprises a surface modification layer on surfaces thereof, the surface modification layer is formed by grafting modifier as organic functional groups on the surfaces thereof.

12. The resin composition of claim 11, wherein the modifier is vinyltrimethoxy silane, and molecular formula of the modifier is:

13. A method for making an inorganic shell, comprising:
providing a mold, the mold being made of material that can be volatilized at a certainly temperature;
providing inorganic powder comprising silica and crystalline inorganic powder;
adsorbing the inorganic powder on surface of the mold;
sintering the mold and the inorganic powder, and then, volatilizing the mold to obtain an inorganic shell; a shell thickness of the inorganic shell is in a range from 20 nanometers to 30 nanometers.

14. The method of claim 13, wherein the mold is made of polymethylmethacrylate.

15. The method of claim 13, wherein the crystalline inorganic powder is crystalline metal oxide or crystalline inorganic salts.

16. The method of claim 13, further comprising: grafting modifier as organic functional groups on the surfaces of the inorganic shell, to form a surface modification layer on the surfaces of the inorganic shell.

17. The method of claim 16, wherein the modifier is vinyltrimethoxy silane, and molecular formula of the modifier is:

18. The method of claim 13, wherein when sintering the mold and the inorganic powder, a sintering oven temperature is in a range from 750 degrees Celsius to 1200 degrees Celsius.

* * * * *